Patented Aug. 7, 1923.

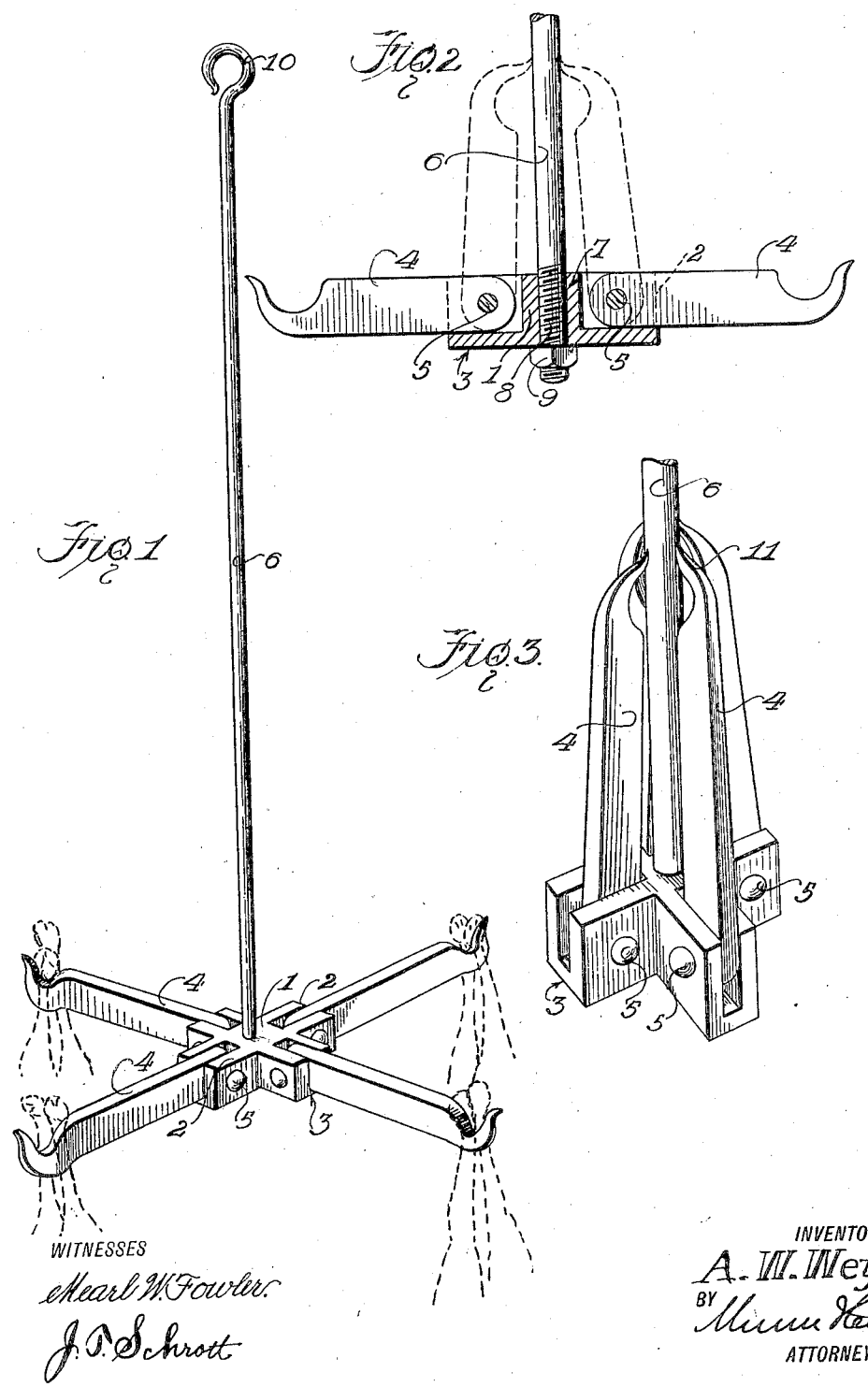

1,464,160

UNITED STATES PATENT OFFICE.

AUGUST WILLIAM WEYEL, OF BALTIMORE, MARYLAND; ELEANORA M. WEYEL ADMINISTRATRIX OF SAID AUGUST W. WEYEL, DECEASED.

MEAT HOOK.

Application filed July 14, 1922. Serial No. 575,065.

*To all whom it may concern:*

Be it known that I, AUGUST W. WEYEL, a citizen of the United States, and a resident of the city of Baltimore, in the State of Maryland, have invented certain new and useful Improvements in Meat Hooks, of which the following is a specification.

My invention relates to improvements in meat hooks and it consists substantially of the construction, arrangement and mode of operation herein described and claimed.

An object of the invention is to provide a meat hook, the individual hook members of which may be swung inwardly toward each other so that the meat hook can be collapsed and stored when not in use.

Another object of the invention is to provide a meat hook with radiating hook members enabling the hanging of more carcasses in a prescribed place than can be hung by the use of the prevailing types of meat hooks.

Other objects and advantages will appear in the following specification, reference being had to the accompanying drawings, in which:

Fig. 1 is a perspective view of the improved meat hook, showing it in use,

Fig. 2 is a cross section showing the hook members extended in full lines and folded in dotted lines, and Fig. 3 is a detail perspective view of the meat hook showing the hook members folded to temporarily place them in an out-of-the-way position.

In carrying out my invention I provide a hook base 1 with which a plurality (four in the present instance) of supports 2 are integrally formed. These supports are closed at 3 underneath, and have sides as shown, for the purpose of enabling the pivotal mounting of the hook members or arms 4 upon rivets, bolts or other fastening means 5 which are passed through these supports.

As clearly shown in Fig. 2, the pivotal mountings 5 are set back from the front open ends of the supports 2 so that when the hook arms 4 are stretched out to the open position, the backs of the hooks will rest against the closed bottoms 3 and by thus checking further outward movement of the hook arms, will hold them in the desired extended or horizontal positions. At the same time, the pivotal mountings 5 are spaced far enough away from the central supporting rod 6 so that when the hook arms are swung up into the dotted line positions, they assume slightly inclined positions which keep them from falling back to the horizontal position and therefore out of the way when desired.

The central part of the base 1 is solid, as shown. This solid portion has a threaded opening 7 into which the similarly threaded end 8 of the supporting rod 6 is screwed and finally fixed in place by a nut 9 on the bottom. The supporting rod may of course be of any desired length and it may be mounted upon a support in any desired manner. Fig. 1 shows the supporting rod 6 to have an eye 10 at the top so that it may be hung upon a hook and thus mount the meat hook.

Each of the arms 4 terminate in a hook 11 upon which the carcass is hung, as shown in Fig. 1. The meat hook is intended to be used in abattoirs, butcher shops, and in fact in any place where meat is usually handled and must be hung up either for the purpose of refrigeration or for temporarily placing it out of the way. The radial arrangement of the hook arms 4 makes it possible to store a greater number of carcasses in a prescribed space than is possible in accordance with the prevalent method of using a series of hooks side by side along a supporting bar. The hook arms 4 are mounted on the pivots 5 sufficiently loose to enable slight transverse movement thereon when the hook arms are moved up into the collapsed position in Fig. 3. This slight movement of the hook arms enables the points of the hooks to pass the supporting rod 6 slightly and thus aid in keeping the hook in the collapsed position.

There may be times when it is desired to close the meat hook either for purposes of transportation, storage or for temporarily disposing the hook arms 4 out of the way. The base 1 may either be removed entirely from the supporting rod in order to enable the accomplishment of the first two purposes and then collapsed, or the hook arms may be collapsed while in position upon the supporting rod, the position then assumed being about as illustrated in Fig. 3.

While the construction and arrangement of the improved meat hook as herein described and claimed, is that of a generally preferred form, obviously modifications and changes may be made without departing from the spirit of the invention or the scope of the claim.

I claim:—

A meat hook comprising a cast base with a threaded opening and having a plurality of radiating supports consisting of parallel sides and integral closed bottoms, a rod by which the meat hook is suspended having a threaded end screwed into and through the opening, a nut screwed on the end of the threaded rod to hold the parts together but enabling future disassembly, a single hook arm mounted at one end between each of the parallel sides and having a hook at the other end, and rivets pivoting the arms on the sides of said supports at distances in from the ends of the supports greater than one-half the width of the arms to cause adequate portions of the lower edges to rest upon said bottoms, and far enough from the suspending rod to cause the arms to slightly incline when folded up, to thereby maintain the folded up position.

AUGUST WILLIAM WEYEL.